(12) United States Patent
Wellhöfer

(10) Patent No.: US 6,714,410 B2
(45) Date of Patent: Mar. 30, 2004

(54) APPARATUS FOR MOUNTING AND COOLING A FLAT SCREEN

(75) Inventor: Stefan Wellhöfer, Schlossvippach (DE)

(73) Assignee: Innowert Service-Center IN Gesellschaft fur Innovation und Kommunikationstechnik mbH (DE)

( * ) Notice: Subject to any disclaimer, the term of this patent is extended or adjusted under 35 U.S.C. 154(b) by 0 days.

(21) Appl. No.: 10/073,561

(22) Filed: Feb. 11, 2002

(65) Prior Publication Data

US 2002/0109969 A1 Aug. 15, 2002

(30) Foreign Application Priority Data

Feb. 12, 2001 (EP) .............................. 01103271

(51) Int. Cl.⁷ ................................. H05K 7/20
(52) U.S. Cl. ........................ 361/687; 364/708.1; 297/67
(58) Field of Search ................. 361/685–687, 361/724, 727; 280/124.134; 297/67; 364/708.1

(56) References Cited

U.S. PATENT DOCUMENTS

| | | | | |
|---|---|---|---|---|
| 5,606,341 A | * | 2/1997 | Aguilera | 345/87 |
| 6,015,186 A | * | 1/2000 | Grieger | 297/67 |
| 6,311,996 B1 | * | 11/2001 | Kato et al. | 280/124.134 |

FOREIGN PATENT DOCUMENTS

| | | | | |
|---|---|---|---|---|
| EP | 0821385 A2 | 1/1998 | ............ | H01J/17/49 |
| JP | 07210093 A | 7/1995 | ............ | G09F/9/313 |
| JP | 10116036 A | 10/1998 | ............. | G09F/9/00 |
| JP | 11119216 A | 11/1999 | ......... | G02F/1/1335 |

OTHER PUBLICATIONS

*Patent Abstracts of Japan*, JP07210093, Publication date Aug. 1995 (1 Page).
*Patent Abstracts of Japan*, JP10116036, Publication date May 1998 (1 Page).
*Patent Abstracts of Japan*, JP11119216, Publication date Apr. 1999 (1 Page).
*International Search Report*, EP01103271, filed Feb. 12, 2001 (2 Pages).

* cited by examiner

*Primary Examiner*—Hung Van Duong
(74) *Attorney, Agent, or Firm*—Wood, Herron & Evans, LLP

(57) ABSTRACT

An apparatus for mounting and cooling a flat screen during operation comprises a housing for accommodating the flat screen and further heat generating electric and electronic units, moreover thermal bridges for conducting the heat generated by at least the flat screen to a heat conductive rear wall of the housing. The rear wall is provided with at least one profile in a manner that a plurality of chimney-like cavities are formed on the rear side of the housing, which comprise in their lower end portion at least one opening for supplying cool air into each cavity, and at least one outlet opening in the upper end portion of each cavity for discharging heated air into the atmosphere.

10 Claims, 4 Drawing Sheets

APPARATUS FOR MOUNTING AND COOLING A FLAT SCREEN

The present application claims priority to European Patent Application No. 01 103 271.1 filed Feb. 12, 2001, the disclosure of which is hereby incorporated herein by reference in its entirety.

FIELD OF THE INVENTION

The present invention relates to an apparatus for mounting and cooling a flat screen.

It can be referred to a flat screen if the ratio of diagonal of the screen to the depth of the screen unit is approximately 10:1 or more. Flat screens of this type are gaining ground basically because of the fact that space and weight can be reduced compared to the conventionally used apparatus that use electron tube technology, and these flat screens will soon supersede conventional screens. The two most important types of flat screens are on the one hand LCD screens and on the other hand screens using plasma displays, hereinafter abbreviated as plasma screens.

Both types of flat screens generate heat when being operated, which must be dissipated from the surrounding housing as quickly and safely as possible. A significant amount of heat is in particular generated by plasma screens because of the high voltages that are required to transfer the respective gas mixture into the light emitting plasma state.

PRIOR ART

The cooling of plasma screens is conventionally performed by means of a plurality of active fans. During unsupervised operation, a failure of one or a plurality of fans may lead to the destruction of the heat generating units or of the entire screen. Moreover, the fans need additional space within the housing provided for the flat screen, thus increasing the total depth thereof. Moreover, the use of fans leads to side noises, which are perceived to be unpleasant in domestic use (for instance as a television set) and when using the apparatus professionally (for instance as a supervision monitor).

SUMMARY OF THE INVENTION

Thus, it is the object of the present invention to provide an extremely small dimensioned apparatus for mounting and cooling a flat screen, by means of which the heat generated can be very safely discharged without the generation of side noises, simultaneously reducing maintenance and repair work to a minimum.

This object is achieved by an apparatus for mounting and cooling a flat screen during operation, comprising a housing for accommodating the flat screen and heat generating electric and electronic units, and comprising at least one thermal bridge for conducting the heat generated by these units to a heat conductive plate arranged on a rear side of the housing, said plate being equipped with a profile for faster cooling of the plate, wherein the plate forms a rear wall of the housing, the profile on the rear wall of the housing forms a plurality of chimney-like cavities each comprising a lower end portion and an upper end portion, wherein in the lower end portion at least one opening for supplying cool air into the respective cavity is provided, and in the upper end portion at least one outlet opening for discharging heated air from the cavity to the atmosphere is provided, and the rear wall of the housing comprises a plurality of through holes arranged in the area of the cavities which serve for supplying and discharging air into or out of a space arranged between the heat generating units and the rear wall.

The apparatus according to the invention for mounting and cooling a flat screen during operation comprises a housing for accommodating a flat screen and possibly further heat-generating electric and/or electronic units, moreover, thermal bridges for conducting the heat generated at least by the flat screen including its electronic control components to a heat conductive rear wall of the housing. The rear wall is provided with a plurality of chimney-like cavities, which each have on their lower end portion at least one opening for supplying cool air into the respective cavity, and at least one outlet opening in the upper end portion of each cavity for discharging heated air to the atmosphere. It is ensured thereby that significant amounts of heat can be transported to the outside without taking the risk of a failure of the cooling apparatus.

In order to be able to conduct the main part of the heat immediately to the atmosphere by the conduction of heat, a thermal bridge made of heat conductive material oriented towards the rear wall of the housing is preferably mounted on at least one position of a printed circuit board attached at the housing frame, with a plurality of heat conductive components of the flat screen being arranged on the printed circuit board, wherein the thermal bridge engages the rear wall during the operative condition of the screen.

For the additional cooling by an exchange of heat, the rear wall of the housing preferably comprises a plurality of through holes, which serve for supplying and discharging air into or from a space arranged between the printed circuit board and the rear wall.

In order to be able to easily conduct the air generated during operation and located between the printed circuit board and a glass plate arranged on the front end side, at least one channel is preferably provided through which the air may reach the space between the printed circuit board and the rear wall.

In order to obtain a more flexible configuration of the apparatus, it is advantageously provided that the profile be screwed onto the rear wall.

In order to achieve that the apparatus may easily fulfil the safety regulations regarding the maximum permitted outer temperature of apparatus, the chimney-like cavities each have a preferably cartridge-like cross section having an end rounded towards the outside.

The individual chimney-like cavities are preferably spaced apart so that an additional air cooling of the connection surfaces in the spaces between the cavities and of the walls of the U-shaped cavities takes place.

The housing frame and the rear wall are preferably formed of extruded aluminium profiles, which have low weight and can be easily worked.

In order to obtain stability while keeping the apparatus optically aesthetic, the frame pieces are advantageously joined by laser welding.

Further details, features and advantages of the present invention can be derived from the following description with reference to the accompanying drawings.

DETAILED DESCRIPTION OF A PREFERRED EMBODIMENT OF THE INVENTION

Figure 1:
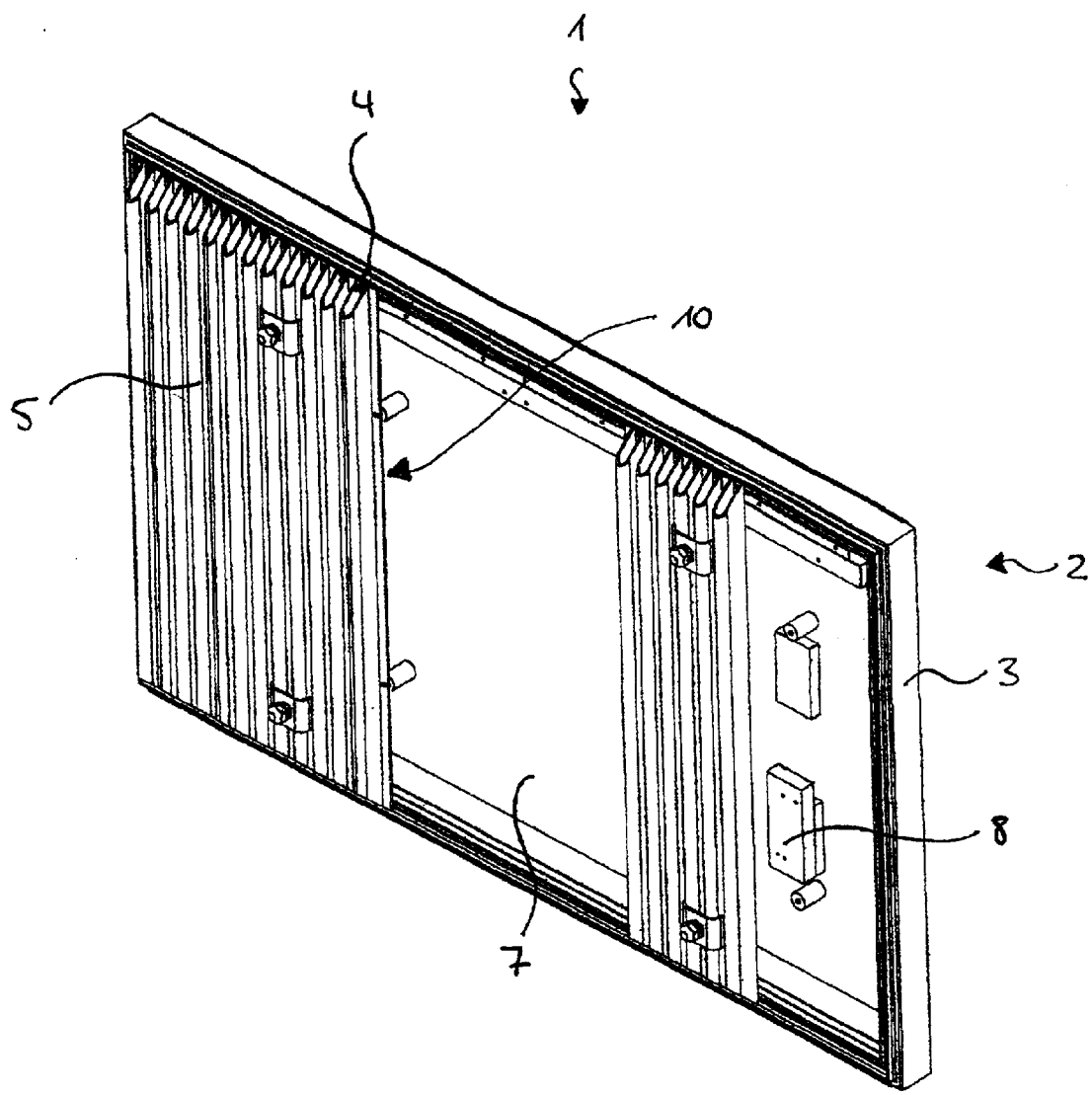
FIG. 1 shows a perspective, diagrammatic rear view of a preferred embodiment of the apparatus according to the invention for mounting and cooling a flat screen.

FIG. 1 diagrammatically shows from the rear side a preferred embodiment of the apparatus 1 according to the invention for mounting and cooling a flat screen. The apparatus 1 comprises a housing 2, which is formed of a flat housing frame 3 and a rear wall 4 having a profile 5 applied thereon, said rear wall only being shown in fragments to show the inner structure. A glass plate is arranged on the front side of the housing 2, as is common in screens. The housing frame 3 is preferably formed of a plurality of frame pieces, which consist of extruded aluminium profiles, which in turn are joined to one another, preferably by laser welding. A printed circuit board 7 is attached in the frame via suitable attachment means. The circuits and/or driver units required for operation of the flat screen are arranged on said printed circuit board. The printed circuit board 7 is attached in the frame 3 in a manner that a space 10 is generated between the printed circuit board and the rear wall 4, with air being located in this space. This space 10 communicates via a channel (not shown) with the area between the printed circuit board 7 and the final glass plate. Thermal bridges 8 for connection between the printed circuit board 7 and the rear wall 4 are formed on the printed circuit board 7 at several locations. These thermal bridges 8 are preferably formed as aluminium blocks or they consist of a similar heat conductive material.

Figure 2:
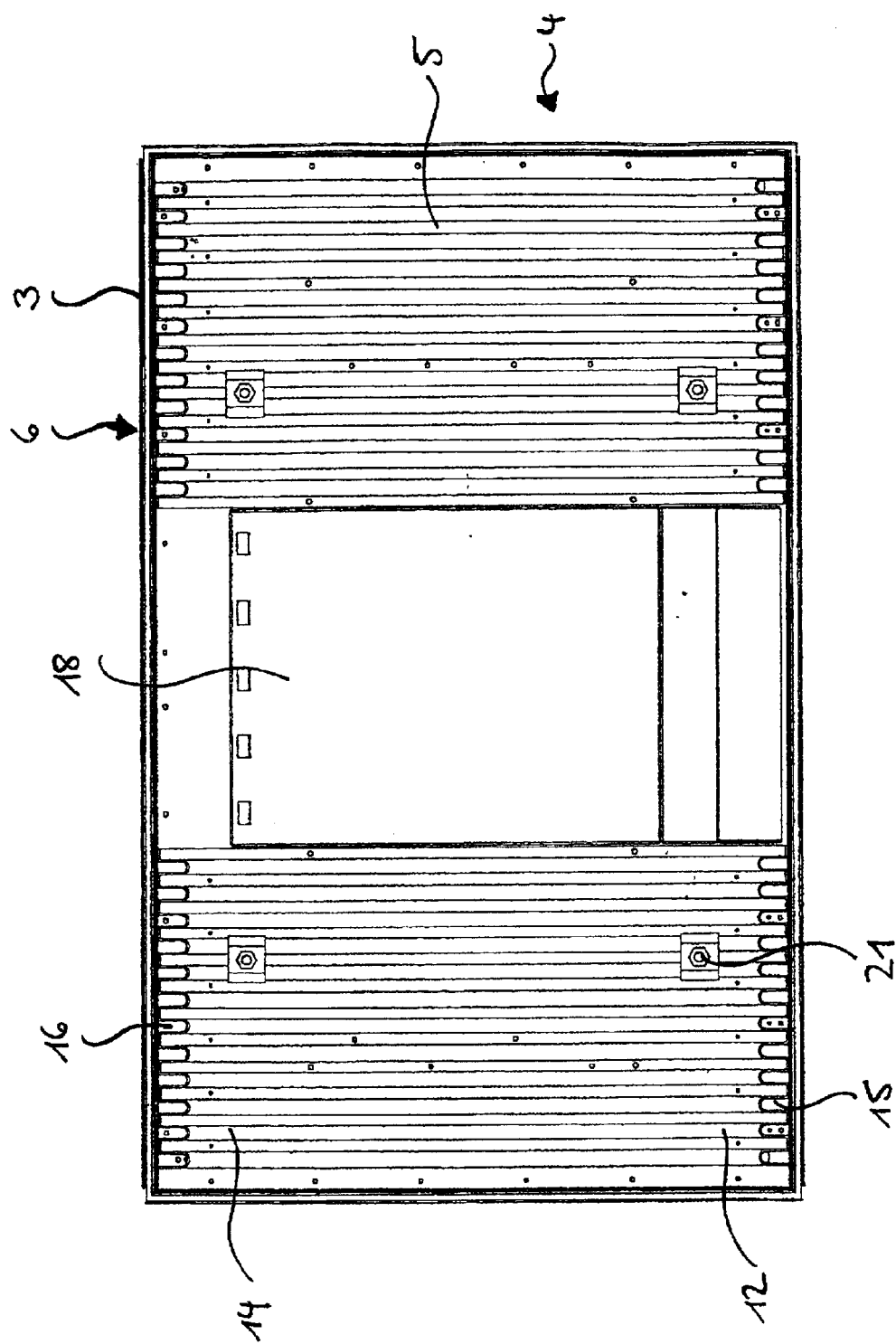
FIG. 2 shows a rear view of a preferred embodiment of the apparatus according to the invention.

FIG. 2 shows a diagrammatic rear view of an embodiment of the apparatus according to the invention in assembled condition. The profiles 5 are attached on the rear wall 4 via screws 21 and each comprise a plurality of chimney-like cavities 6, which extend in the vertical direction. In their lower end portion 12, the cavities 6 each have inlet openings 15 and in their upper end portion 14 they comprise outlet openings 16. It is also conceivable that the rear wall 4 itself is formed integral with such chimney-like cavities 6. Between the two portions in which the profiles 5 are screwed on, an additional box 18 may be connected to the rear wall 4, as in the present case, in which e.g. the power supply, the VGA card and the driver electronic units for the flat screen are contained. The heat discharge of the components contained therein is performed e.g. via thermal bridges onto the rear wall 4 or via air holes to the atmosphere.

Figure 3:
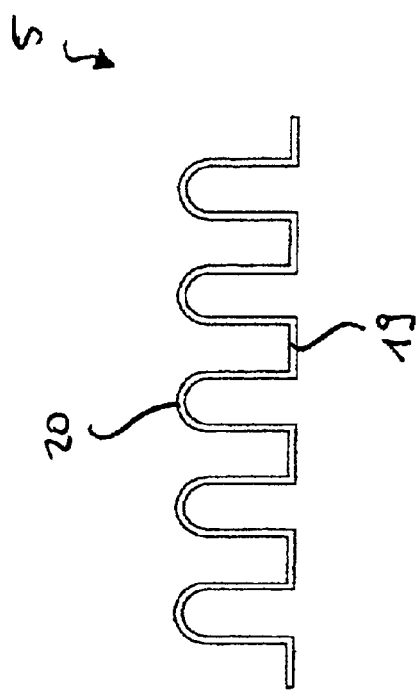
FIG. 3 shows a cross section through a preferred embodiment of a profile.

FIG. 3 shows in cross-sectional view a preferred embodiment of a profile 5. The profile consists of a plurality of U-shaped bulges 20 connected with each other via horizontal connection surfaces 19, said bulges being arranged adjacently at regular distances. The distance between two such bulges 20 is approximately equal to the lateral dimensions of a bulge 20.

Figure 4:
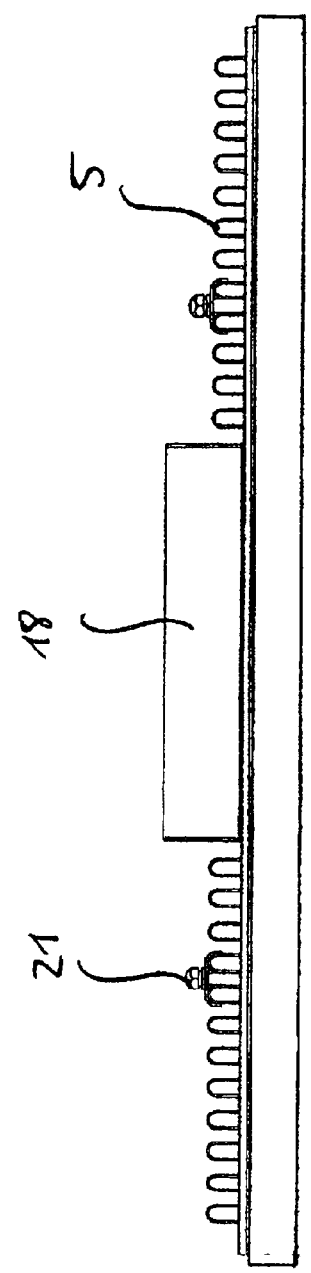
FIG. 4 shows a top view onto the apparatus according to FIG. 2.

If such profiles 5 are connected to the rear wall 4 via suitable screws 21 or another attachment device, as shown in FIG. 4, the chimney-like cavities 6 are formed between the rear wall 5 and the bulges 20 of the profiles 5, said cavities being formed in a cartridge-like manner, wherein the rounded end of the bulge 20 points outwardly. The longer the legs of the U-shaped bulges 20 are the better is the cooling effect. In assembled condition, the connection surfaces 19 directly engage the rear wall 4 so that a heat transfer by heat conduction takes place at these connection surfaces. The profile 5 and the rear wall 4 are preferably also formed of extruded aluminium profiles.

Figure 5:
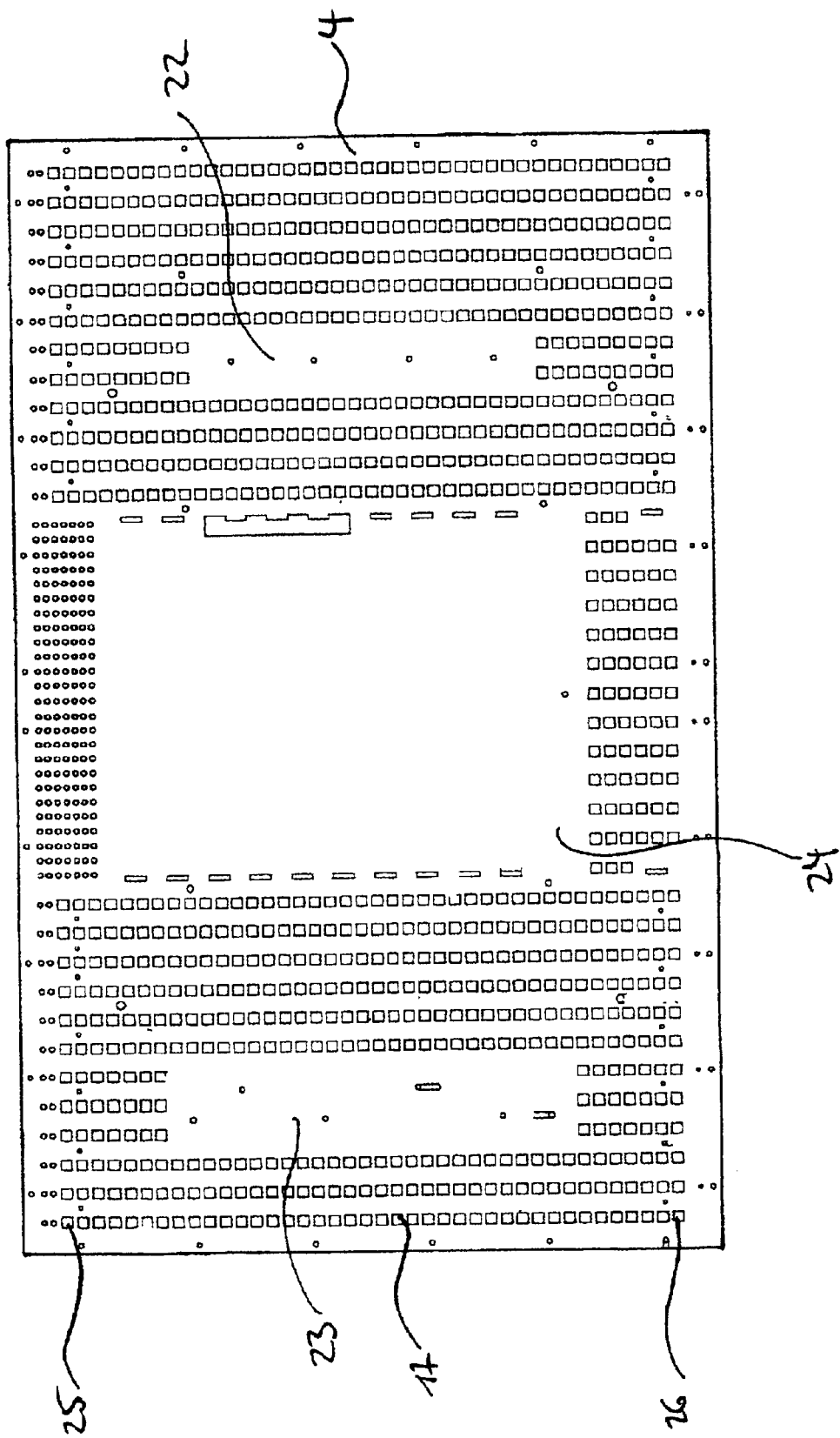
FIG. 5 shows a diagrammatic view of preferred embodiment of the rear wall of an apparatus according to the invention for mounting and cooling a flat screen.

FIG. 5 shows an embodiment of a rear wall 4 of the apparatus 1 according to the invention. In the present example, the rear wall 4 comprises three integral surfaces 22, 23 and 24. Both surfaces 22 and 23 are arranged in a manner that in mounted condition they fixedly contact the thermal bridges 8 arranged at the printed circuit boards 7. The central surface 24 is provided for the attachment of the operating box 16. A plurality of vertically extending rows of e.g. square through holes 17 are arranged on the remaining rear wall 4 at a distance of the profile cavities 6. Additional ribs or other surface enlargements may be arranged on the inner side of the rear wall 4 between two rows of through holes 17 to provide of a better heat collection from the air located in the space 10.

During operation of the flat screen, the heat generating elements of the flat screen disposed on the printed circuit board become hot and directly discharge their heat via the thermal bridges 8 to the closed surfaces 22, 23 of the rear wall 4 of the housing 2. The discharged heat distributes over the rear wall 4 onto the connection surfaces 19 and bulges 20 of the profiles and is discharged to the air in the cavities 6 or to the ambient air. The heated air in the cavities flows upwardly and is discharged to the atmosphere via openings 16, whereas at the same time cool air flows in from the bottom through the openings 15. The connection surfaces 19 and the bulges 20 discharge heat to the outside into the surrounding air, wherein it is made use of the known principle of surface enlargement. It is also conceivable to arrange the cavities 6 directly adjacent to each other. The air located between the printed circuit board and the front glass plate severely heats up and is conducted into the space 10 via a plurality of channels laterally and above of the printed circuit board and is conducted into the chimney-like cavities 6 through the through holes 17, in particular through the upper through holes 25 together with the air located in the space and heated there by the components of the printed circuit board 7. Due to the suction effect of the cavities, the heated air is discharged to the atmosphere upwards through the outlet openings 16. At the same time cool air flows into the space through the through holes 26 arranged further downwards and through connection channels in the area between the printed circuit board 7 and the front glass plate.

Significant amounts of heat are transported to the atmosphere by the above described cooling mechanism so that the maximum temperature limit of 42° C. at the outer surfaces to be observed according to the rules of apparatus safety is reached neither at the housing frame nor at the profile.

It is also conceivable to also integrate into the housing further electric and/or electronic units, i.e. mother boards for operating the flat screen, and to discharge the additional heat generated thereby via similar cooling mechanisms.

What is claimed is:

1. An apparatus for mounting and cooling a flat screen during operation, comprising a housing for accommodating the flat screen and heat generating electric and electronic units, and at least one thermal bridge for conducting the heat generated by these units to a heat conductive plate arranged at a rear side of the housing, said plate being provided with a profile for faster cooling of the plate, wherein the plate forms a rear wall of the housing, the profile forms a plurality of chimney-like cavities on the rear side of the housing, said cavities each comprising a lower end portion and an upper end portion, wherein in the lower end portion at least one opening for supplying cool air into the respective cavity is formed and in the upper end portion at least one outlet opening for discharging heated air from the cavity to the atmosphere is formed, and the rear wall of the housing comprises a plurality of through holes arranged adjacent to said cavities, said through holes serving for supplying air from said cavities into a space arranged between the heat generating units and the rear wall and for discharging heated air from said coats into said cavities, respectively.

2. An apparatus as claimed in claim 1, wherein the housing comprises a housing frame and a thermal bridge made of heat conductive material is formed on at least one position of a printed circuit board attached on the housing frame, with a plurality of heat generating components of the flat screen being arranged on said printed circuit board, said thermal bridge being oriented towards the rear wall of the housing and contacting the rear wall in operation.

3. An apparatus as claimed in claim 2, in which the air located between the printed circuit board and a final front glass plate of the flat screen and being heated during operation is conducted into a space between the printed circuit board and the rear wall via at least one channel.

4. An apparatus as claimed in one of claims 1 to 3, in which the profile is attached to the rear wall by means of screws.

5. An apparatus as claimed in one of claims 1 to 3, wherein the chimney-like cavities each have a spacing from one another.

6. An apparatus as claimed in one of claims 2 and 3, in which the housing frame and the rear well are formed of extruded aluminum profiles.

7. An apparatus as claimed in one of claims 1 to 3, in which the chimney-like cavities have an essentially cartridge-like cross section which has a rounded apex directed to the outside.

8. An apparatus as claimed in claim 4, in which the chimney-like cavities have an essentially cartridge-like crass section which has a rounded apex directed to the outside.

9. An apparatus as claimed in claim 6, in which the housing frame consists of a plurality of parts that are joined by means of laser welding.

10. An apparatus for mounting and cooling a flat screen during operation, comprising a housing for accommodating the flat screen, and comprising heat-generating electric and electronic units, and at least one thermal bridge for conducting the heat generated by these units to a heat conductive plate arranged at a rear side of the housing, said plate being provided with a profile for faster cooling of the plate, wherein the plate forms a rear wall of the housing, the profile is attached on the rear wall of the housing by means of screws and together with the rear wall forms a plurality of chimney-like cavities, which are arranged at mutual distance and have a substantially cartridge-like cross section with a rounded apex directed to the outside and each comprise a lower end portion and an upper end portion, wherein the lower end portion at least one opening Is formed for supplying cool air into the respective cavity and in the upper end portion at least one outlet opening is formed for discharging heated air from the cavity to the atmosphere, the rear wall of the housing comprises a plurality of through holes arranged in the area of the cavities, said through hales serving for supplying and discharging air into and from a space arranged between the heat generating units and the rear wall, the housing comprises a housing frame, and a thermal bridge of a heat-conductive material is formed on at least one position of a printed circuit board attached at the housing frame, with a plurality of heat generating components of the flat screen being arranged on the printed circuit board, and said thermal bridge being oriented towards the rear wall of the housing and contacting the rear wall in the operative condition, and the air located between the printed circuit board and a final front glass plate of the flat screen heated during operation of the screen is introduced via at least one channel into the space between the printed circuit board and the rear wall.

* * * * *

UNITED STATES PATENT AND TRADEMARK OFFICE
CERTIFICATE OF CORRECTION

PATENT NO. : 6,714,410 B2
DATED : March 30, 2004
INVENTOR(S) : Stefan Wellhöfer

It is certified that error appears in the above-identified patent and that said Letters Patent is hereby corrected as shown below:

<u>Title page,</u>
Item [73], Assignee, change "Innowert Service-Center IN Gesellschaft fur Innovation und Kommunikationstechnik mbH" to -- Innowert Service-Center IN Gesellschaft für Innovation und Kommunikationstechnik mbH --.

<u>Column 5,</u>
Line 13, change "discharging heated air from said coats into said cavities," to
-- discharging heated air from said space into said cavitites, --.
Line 34, change "housing frame and the rear well are formed" to -- housing frame and the rear wall are formed --.
Line 41, change "cartridge-like crass section" to -- cartridge-like cross section --.

<u>Column 6,</u>
Lines 19-20, change "wherein the lower end portion at least one opening Is formed" to
-- wherein in the lower end portion at least one opening is formed --.
Line 26, change "through hales serving" to -- through holes serving --.

Signed and Sealed this

Seventh Day of June, 2005

JON W. DUDAS
*Director of the United States Patent and Trademark Office*